(12) United States Patent  
Garcia, III et al.

(10) Patent No.: US 8,010,425 B1  
(45) Date of Patent: Aug. 30, 2011

(54) METHOD AND APPARATUS FOR EXTENDING CREDIT

(75) Inventors: Benét E. Garcia, III, Winnetka, CA (US); Michael J. Miller, Simi Valley, CA (US); Anderson R. Woods, Los Angeles, CA (US); James G. Bacon, Glendale, CA (US); Hagop Guiragosian, Glendale, CA (US)

(73) Assignee: The Sunshine Trust, Glendale, CA (US)

( * ) Notice: Subject to any disclaimer, the term of this patent is extended or adjusted under 35 U.S.C. 154(b) by 2156 days.

(21) Appl. No.: 10/732,177

(22) Filed: Dec. 9, 2003

Related U.S. Application Data

(60) Provisional application No. 60/455,645, filed on Mar. 17, 2003.

(51) Int. Cl.  
*G06Q 40/00* (2006.01)

(52) U.S. Cl. ............... 705/35; 705/38; 705/39

(58) Field of Classification Search .............. 705/35  
See application file for complete search history.

(56) References Cited

U.S. PATENT DOCUMENTS

| | | | | |
|---|---|---|---|---|
| 6,957,192 B1 * | 10/2005 | Peth | ............... | 705/38 |
| 7,472,090 B1 * | 12/2008 | White | ............... | 705/38 |
| 2001/0047306 A1 * | 11/2001 | Garretson | ............... | 705/26 |
| 2001/0051924 A1 * | 12/2001 | Uberti | ............... | 705/44 |
| 2002/0026394 A1 * | 2/2002 | Savage et al. | ............... | 705/34 |
| 2002/0112170 A1 * | 8/2002 | Foley et al. | ............... | 713/184 |
| 2003/0004894 A1 * | 1/2003 | Rowney et al. | ............... | 705/64 |
| 2004/0044588 A1 * | 3/2004 | Smith et al. | ............... | 705/27 |
| 2004/0122685 A1 * | 6/2004 | Bunce | ............... | 705/1 |
| 2004/0210531 A1 * | 10/2004 | Barron et al. | ............... | 705/44 |
| 2004/0243520 A1 * | 12/2004 | Bishop et al. | ............... | 705/75 |
| 2004/0267559 A1 * | 12/2004 | Hinderer et al. | ............... | 705/1 |
| 2005/0131792 A1 * | 6/2005 | Rowe | ............... | 705/35 |
| 2006/0085282 A1 * | 4/2006 | Hanai et al. | ............... | 705/26 |

* cited by examiner

*Primary Examiner* — Jagdish N Patel  
*Assistant Examiner* — Kevin Poe  
(74) *Attorney, Agent, or Firm* — Christie, Parker & Hale, LLP

(57) ABSTRACT

In one aspect of the invention, a customer accesses an eCommerce server maintained by a merchant via a communications network such as the Internet. Before the customer can complete a transaction, such as ordering goods or receiving on-line services, the merchant requests a tender of payment. If the tender of payment is declined, the merchant offers the customer credit for completing the transaction wherein the credit is guaranteed by a guarantor. The guarantor pays the merchant for the customer's transaction and sends an account statement including a request for payment to the customer. The amount the guarantor pays to the merchant may be dependent on the reason for the decline and one whether or not customer information is used to verify the customer. The account statement may also include an offer to the customer by the guarantor of a credit account.

29 Claims, 11 Drawing Sheets

METHOD AND APPARATUS FOR EXTENDING CREDIT

CROSS-REFERENCE TO RELATED APPLICATION

The present application claims priority to U.S. Provisional Patent Application No. 60/455,645, filed Mar. 17, 2003 which is hereby incorporated by reference as if set forth in full herein.

BACKGROUND OF THE INVENTION

The present invention relates generally to methods and systems of extending credit and more specifically to extending credit to a customer during an electronic transaction.

The growth of the Internet has created a corollary explosion in electronic transactions occurring over the Internet for the procurement of goods and services. Since the inception of the Internet, a preferred method of payment has been a credit card in one of its various incarnations. Accordingly, Internet transaction processing has been limited by a user's ability to obtain one or more of these transaction vehicles.

Furthermore, credit card associations have applied increasing pressure to merchants accepting their vehicle to maintain chargeback and return percentages under thresholds set forth by the associations. In the fluid and anonymous Internet environment, meeting these requirements becomes difficult, necessitating that a merchant apply exceedingly stern "transaction scrubbing" guidelines which cause many transactions which might otherwise have been accepted in a "brick and mortar" establishment to fail in the electronic environment.

Payment methods other than credit card transactions are available to Internet merchants including Automated Clearing House (ACH) payment methods and "e-cash". However, both of these transactions have not been well accepted by customers who still prefer credit cards. Currently and in the foreseeable future, credit card transactions will dominate the world of Internet commerce.

Additionally, previous Internet payment vehicles have assumed that the customer already has a credit account established that may be used to tender payment during an electronic transaction. However, some customers may not want to use their pre-existing accounts or may simply never have adopted credit accounts for use in their previous transactions.

Recognizing this, a need exists for a method and system through which declined transactions, or transactions halted because a customer was unwilling or unable to tender payment in the form of an acceptable transaction vehicle, can be obtained and converted into credit through which income may be generated. Various aspects of the present invention meet such a need.

SUMMARY OF THE INVENTION

In one aspect of the invention, a customer accesses an ecommerce site maintained by a merchant via a communications network such as the Internet. Before the customer can access the site, the merchant requests a tender of credit worthiness such as an identifier for a valid credit card. If the tender of credit worthiness is declined by a third party, such as the issuer of the credit card, the merchant offers the customer credit for accessing the site wherein the credit is guaranteed by a guarantor. The guarantor pays the merchant for the customer's use of the site and sends a statement to the customer for payment.

In another aspect of the invention, the guarantor pays the merchant a discounted amount for the customer's use of the site.

In another aspect of the invention, the guarantor extends an offer of credit to the customer when the guarantor sends the statement to the customer.

In another aspect of the invention, the guarantor verifies the identification of the customer before the customer is granted access to the site.

In another aspect of the invention, the merchant determines the reason the tender of credit worthiness was declined by the third-party and offers credit to customers with specified decline types.

In another aspect of the invention, a customer accesses an ecommerce site maintained by a merchant via a communications network such as the Internet. The merchant invites the customer to open a credit account that will be debited for the customer's use of the ecommerce site wherein the credit account is guaranteed by a guarantor. The guarantor pays the merchant for the customer's use of the site and sends a statement to the customer for payment.

In another aspect of the invention, a method is provided for providing credit to a customer by a merchant through a guarantor. In the method, the guarantor receives customer information from the merchant. The customer information corresponds to a customer attempting to complete a transaction with the merchant. The transaction may be a request for access to services provided by the merchant or a purchase of goods from the merchant. The guarantor generates an account for the customer with the account debited for the amount of the transaction. The guarantor transmits a payment for the transaction to the merchant. The guarantor also transmits a request for full payment of the debited amount in the account. If the customer pays the debited amount, a single-use credit account is thus created for the customer for use in completing the transaction.

In another aspect of the invention, the guarantor includes an offer to convert the account into a credit account with the request for payment. If the customer accepts the offer, the guarantor converts the account into a credit account.

In another aspect of the invention, the guarantor discounts the payment made to the merchant by a discount rate.

In another aspect of the invention, the guarantor uses the customer information to verify the customer's identity. If the guarantor can verify the identity of the customer, then the guarantor adjusts the discount rate used to calculate the merchant's payment. The guarantor may use either a local customer database having customer information or may use a third party personal data server to verify the customer's identity.

In another aspect of the invention, the customer offers a tender of payment to the merchant. The guarantor receives a decline type from the merchant with the decline type indicating why the customer's tender of payment was declined. The guarantor creates the account for the customer when the decline type is of a specified decline type.

BRIEF DESCRIPTION OF THE DRAWINGS

These and additional features, aspects, and advantages of the present invention will become better understood with regard to the following detailed description, append claims, and accompanying drawings where:

DETAILED DESCRIPTION

The present invention provides a method and system by which credit is granted to an Internet commerce site customer during a transaction, thereby allowing the customer to complete an intended purchase of goods or services thus creating a debt portfolio for a credit grantor. The credit grantor may then collect the balance in full and any relevant charges related to the collection of this debt including all legal interest and fees. This system and method facilitates Internet commerce by granting credit and creating a credit account at the moment of a transaction. Furthermore, the credit may be short-lived in that the customer may close the credit account by paying the balance off in full, thus converting the credit account into a single-use credit account, or may convert the credit account into a long term credit account that may be used for further transactions.

In accordance with the present invention, the credit grantor may acquire declinations through any fashion appropriate to the grantor and the holder of the declined transaction. Once the decline is obtained, the grantor will then extend an offer to a customer for credit in the amount of the originally intended purchase. Should the customer decline, no further action is taken relevant to this transaction. Should the customer accept the offer of credit, a contract is formed and a line of credit is established providing the grantor of credit all relevant rights and liabilities related to the care and collection of the contracted debt.

Figure 1:
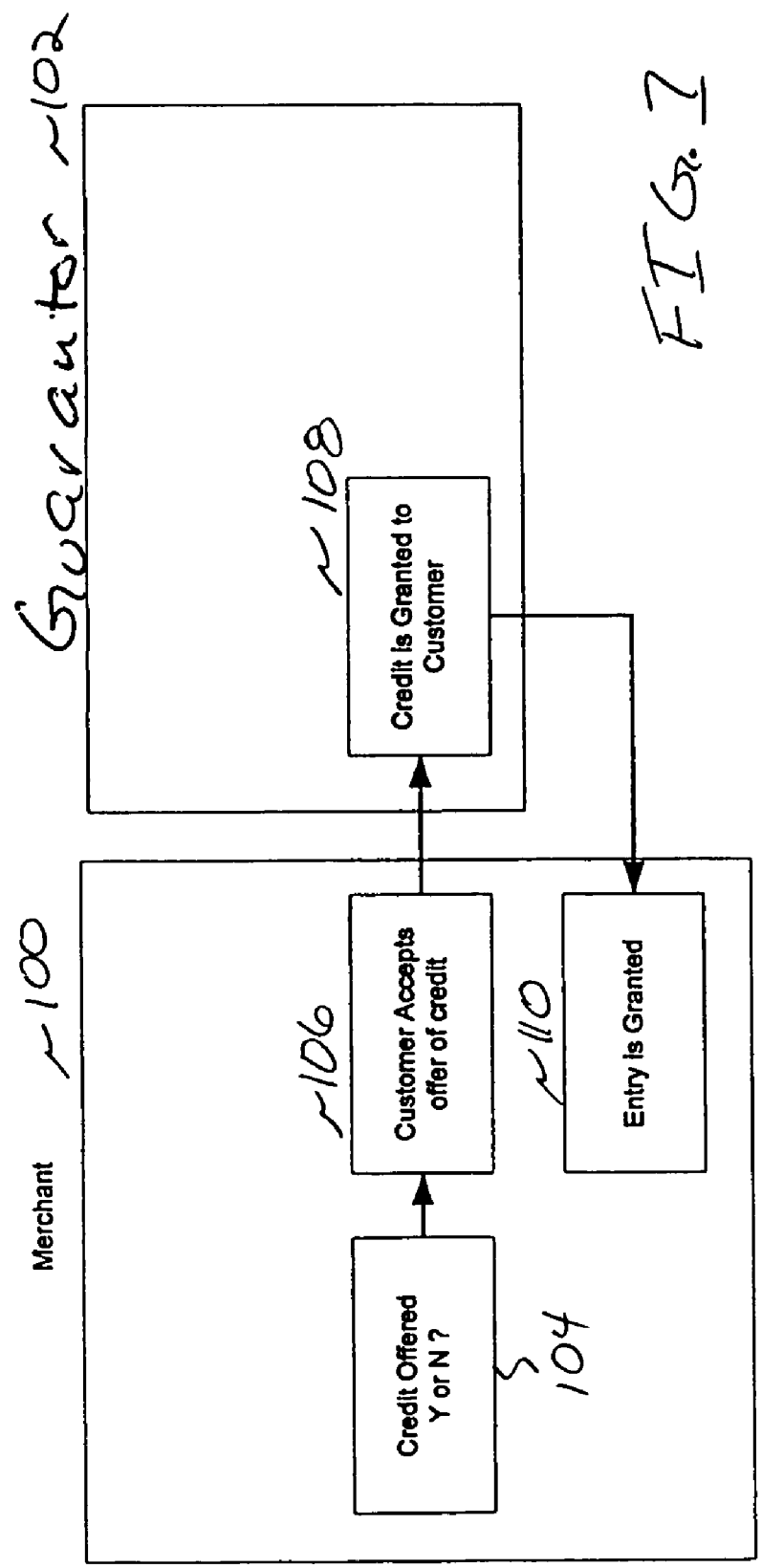
FIG. 1 is a process flow diagram of an exemplary credit offering transaction between a customer, a merchant, and a guarantor in accordance with an exemplary embodiment of the present invention.

FIG. 1 is a process flow diagram of an exemplary credit offering transaction between a customer, a merchant 100, and a guarantor 102 in accordance with an exemplary embodiment of the present invention. A merchant accepts a tender of payment from a customer as payment for a transaction. The transaction may be any kind of transaction such as accessing the merchant's Web site in order to receive services or content or accessing the merchant's Web site to purchase goods sold through the Web site. The tender of payment may be a tender of credit or credit worthiness such as a credit card account identifier. The merchant then attempts to verify the credit by contacting the issuer of the credit and request payment. If the request for payment is declined, the merchant then offers (104) credit to the customer. If the customer accepts (106) the offer, then the merchant contacts the guarantor and the guarantor grants (108) credit to the customer for the amount of the payment. Once credit is granted, the customer is allowed to access (110) the merchant's Web site or purchase the goods from the merchant.

Figure 2:
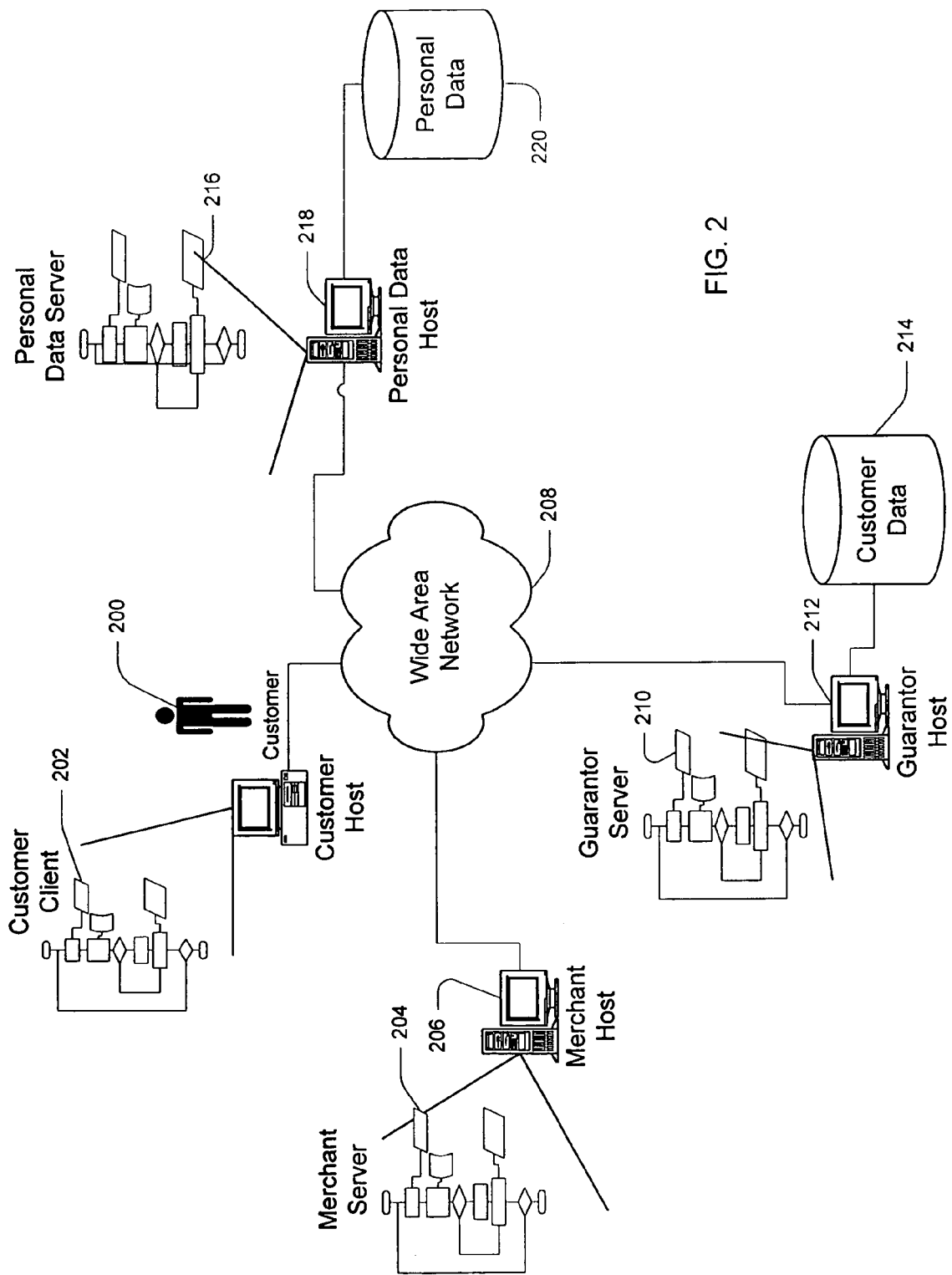
FIG. 2 is a deployment diagram of a credit offering system in accordance with an exemplary embodiment of the present invention.

FIG. 2 is a deployment diagram of a credit offering system in accordance with an exemplary embodiment of the present invention. A customer 200 uses a customer client 202, such as a Web browser, to access a merchant server 204, such as an eCommerce Web site, hosted by a merchant host 206 via a wide area communications network 208 such as the Internet. The merchant server can also access a guarantor server 210 hosted by a guarantor host 212 via the wide area network. The guarantor server receives customer information from the merchant server and extends credit to the customer. The guarantor server is coupled to a customer database 214 and stores the customer information in the customer database for further reference and use. The guarantor server is also coupled via the communications network to a personal data server 216 hosted by a personal data host 218. The personal data server is further coupled to a personal data database 220 including publicly available data on a large population of people. The guarantor server uses the personal data server to access corroborating information used to verify the customer information provided by a customer.

The customer database provides additional functionality beyond storing customer data for use in maintaining customer accounts. The customer database can also provide a storage location for customer information and corroborating information received from the personal data server that may be used to verify a customer's identity. By storing the corroborating information in the customer database, the guarantor server may not have to access the personal data server each time the guarantor server verifies customer information. This may provide a cost savings to the guarantor as the guarantor may have to pay for access to the personal data server.

Figure 3:
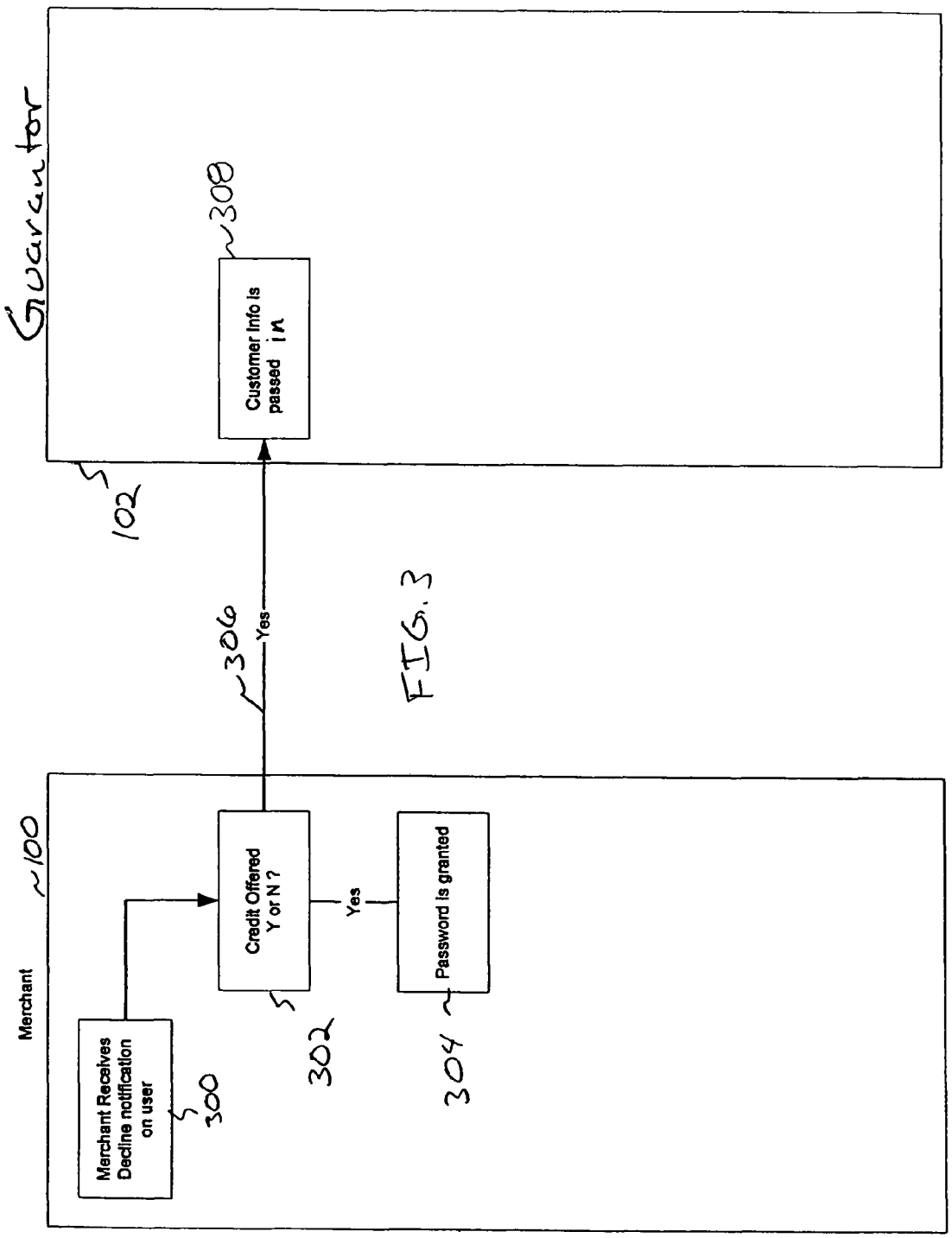
FIG. 3 is a process flow diagram of a credit offering transaction in accordance with an exemplary embodiment of the present invention.

FIG. 3 is a process flow diagram of a credit offering transaction in accordance with an exemplary embodiment of the present invention. The merchant 100 receives a credit or payment decline for a user or customer. The customer is immediately offered credit by the merchant without preforming any form of verification process such as a credit or identity check. If the customer accepts (302) the offered credit, the merchant grants (304) the customer access to the merchant's site.

In response to the customer's acceptance of the offer of credit, the merchant also transmits customer information (306) to the guarantor. The guarantor receives (308) the customer information. The guarantor uses the customer information to bill the customer for accessing the merchant's site. In this exemplary transaction, the customer's information is not verified by the guarantor, thus increasing the risk that the guarantor will not be paid by the customer. As such, the guarantor pays the merchant at a discounted rate for the customer's use of the merchant's site.

Figure 4:
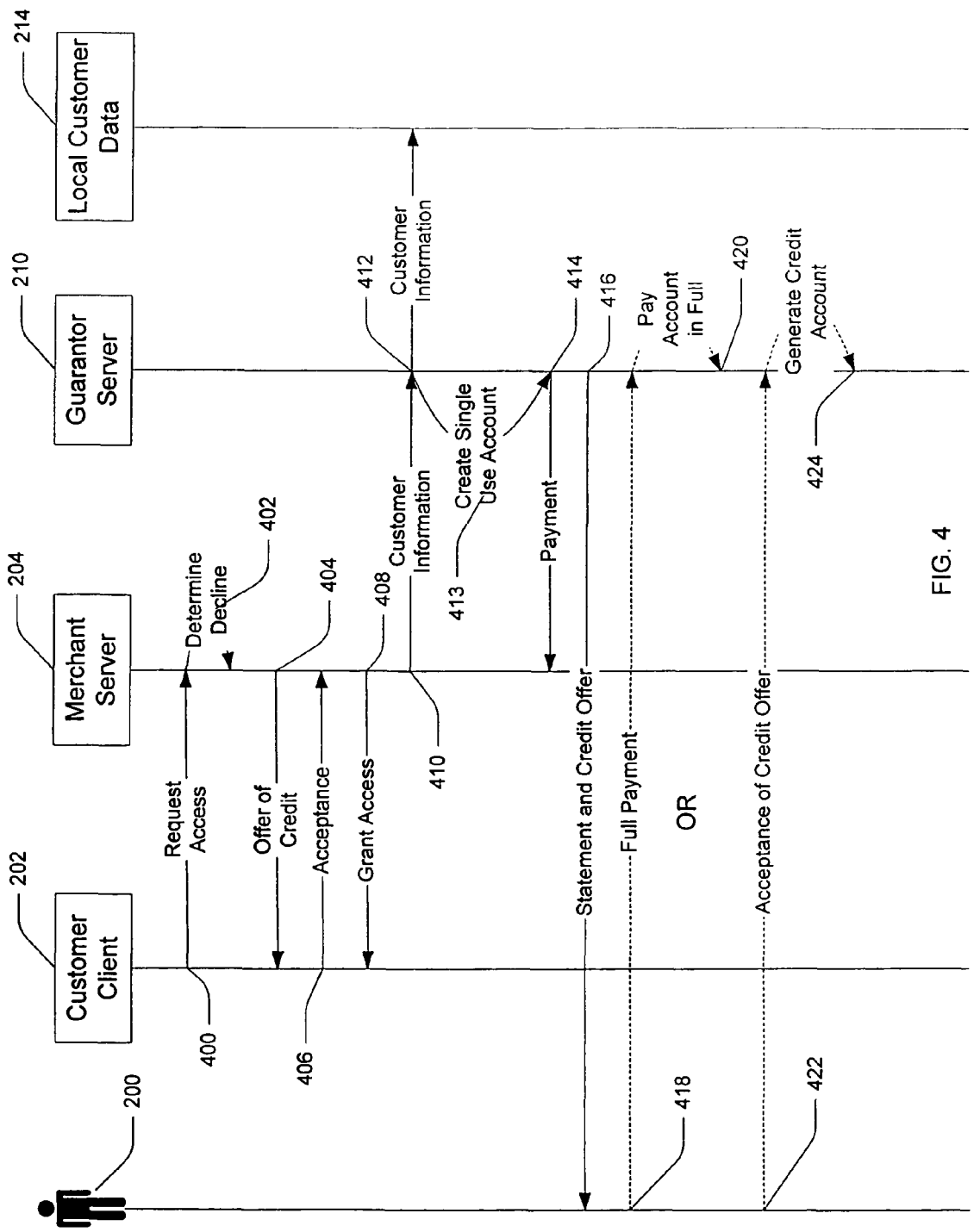
FIG. 4 is a sequence diagram of a credit offering transaction in accordance with an exemplary embodiment of the present invention.

FIG. 4 is a sequence diagram of a credit offering transaction in accordance with an exemplary embodiment of the present invention. In slightly more detail than in FIG. 3, the customer 200 uses the customer client 202 to transmit a request for access 300 to the merchant server 204. The request for access includes an identifier of a credit account that the customer tenders as payment. Also included in the request is customer information such as the customer's name and date of birth. If the merchant server determines (402) that the request for payment is declined by the issuer of the tendered credit, the merchant server transmits an offer of credit 404 to the customer via the customer's client. The customer uses the customer client to transmit an acceptance 406 of the offer of credit to the merchant server. The merchant server receives the acceptance and the merchant server transmits a grant of access 408 to the customer via the customer client.

The merchant server then transmits the customer information 410 to the guarantor server 210. The guarantor server stores the customer information 412 in the customer database 214 local to the guarantor server. The guarantor server then creates (413) an account for the customer using the customer information and transmits a payment 414 to the merchant server. The guarantor server generates an account statement and request for payment 416 which is transmitted to the customer. Included with the account statement and request for payment is an offer of a credit account. The customer may either pay the full payment amount 418 as requested or (as indicated by the dashed lines) or may accept 422 the offer of the credit account. If the customer pays the full amount, the guarantor server pays off (420) the account, thus closing it. If the customer accepts the offer of credit, guarantor server creates (424) a credit account from the single use account and the requested payment amount is added to the balance of the credit account.

Figure 5:
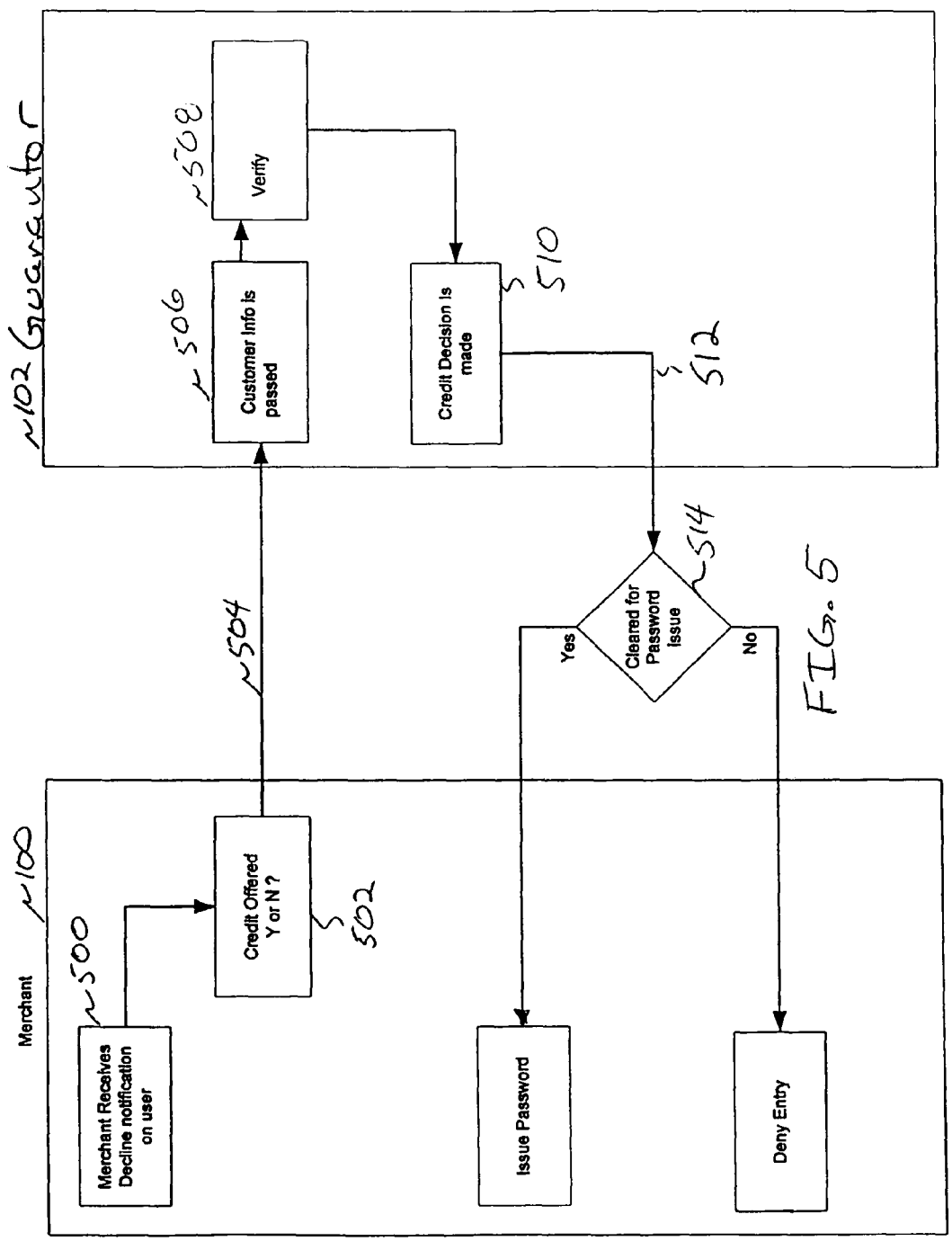
FIG. 5 is a process flow diagram of a credit offering transaction wherein a customer's information is verified in accordance with an exemplary embodiment of the present invention.

FIG. 5 is a process flow diagram of a credit offering transaction wherein a customer's information is verified in accordance with an exemplary embodiment of the present invention. The merchant 100 receives (500) a credit or payment decline for a customer. In response to the decline, the merchant asks the customer if the customer wants to open a credit account that may be used to pay for the merchant's goods or services. If the customer accepts (502) the offered credit, the merchant transmits customer information 504 to the guarantor 102.

The guarantor receives (506) and verifies (508) the customer information. If the customer information is verified, the guarantor determines (510) if the guarantor wants to offer credit to the customer based on the verified customer information. The credit decision 512 is transmitted to the merchant. Based on the credit decision, the merchant determines (514) whether or not the merchant will issue a password (516) or deny entry (518) to the customer.

The verification process may or may not include a full credit check of the customer. For example, the guarantor may be only concerned with the identity of the customer. In this case, a credit check is not performed. Instead, the guarantor queries a local customer database or public database to corroborate the customer information. In this way, the amount of customer information supplied by the customer is reduced as compared to the amount of customer information supplied for a full credit report. In addition, the verification process may avoid asking a customer for sensitive information that the customer may not be willing to supply. Finally, the avoidance of a full credit check may provide a cost savings to the guarantor because the guarantor need not pay access fees to a third party credit check database.

In contrast to the exemplary transactions of FIG. 3 and FIG. 4, the customer is granted access to the merchant's site after the guarantor has verified the customer's information and made a credit decision about whether or not to offer credit to the customer. In this exemplary transaction, the customer's information is verified by the guarantor, thus lowering the risk that the guarantor will not be paid by the customer. As such, the guarantor may pay the merchant at a higher rate than for an unverified customer.

Figure 6:
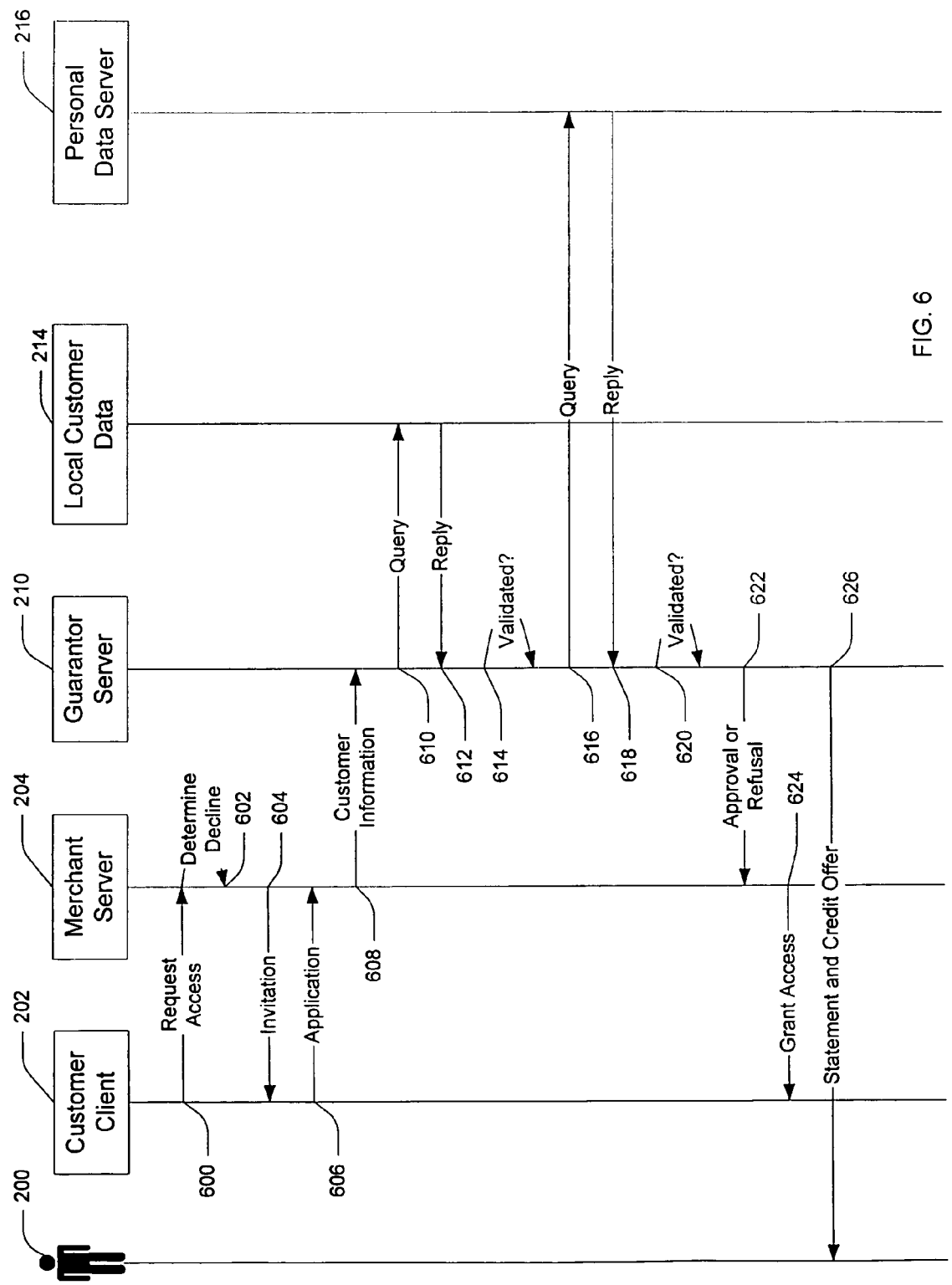
FIG. 6 is a sequence diagram of a credit offering transaction wherein a customer's information is verified in accordance with an exemplary embodiment of the present invention.

FIG. 6 is a sequence diagram of a credit offering transaction wherein a customer's information is verified in accordance with an exemplary embodiment of the present invention. In slightly more detail than in FIG. 5, the customer 200 uses a customer client 202 to transmit a request for access 600 to the merchant server 204. The request for access includes an identifier of a credit account that the customer tenders as payment. The request further includes customer information such as the customer's name, date of birth, address, and other identifying information that a guarantor might use to verify the customer's identity and credit worthiness. If the merchant server determines (602) that a request for payment from the issuer of the credit account is declined (602), the merchant server transmits an invitation for a credit application (604) to the customer via the customer client. If the customer decides to apply for a credit account, The customer uses the customer client to transmit a credit application (606) to the merchant server.

If the customer submits an application for credit, the merchant server transmits the customer information 608 to the guarantor server 210. The guarantor server uses the customer information to generate a query 610 which is used to query the customer database 214 maintained by the guarantor. If the query fails, meaning the guarantor cannot verify or validate (614) the customer by a corroborating response from the customer database, the guarantor server transmits a query 616 to the personal data server 216 for corroborating information and verification. The guarantor server uses the reply 618 from the personal data server to verify or validate 620 the customer. Depending on the results of the validation process, the guarantor server transmits either a payment or a refusal 622 to the merchant server. If the merchant server receives a payment from the guarantor server, the merchant server grants access 624 to the customer.

The guarantor server generates an account statement and request for payment 626 that is sent to the customer. In a manner similar to the payment or credit process in FIG. 4, included with the account statement and request for payment is an offer of a credit account. The customer may either pay the payment amount as requested or may accept the offer of the credit account in which case the requested payment amount is added to the balance of the offered credit account.

Figure 7:
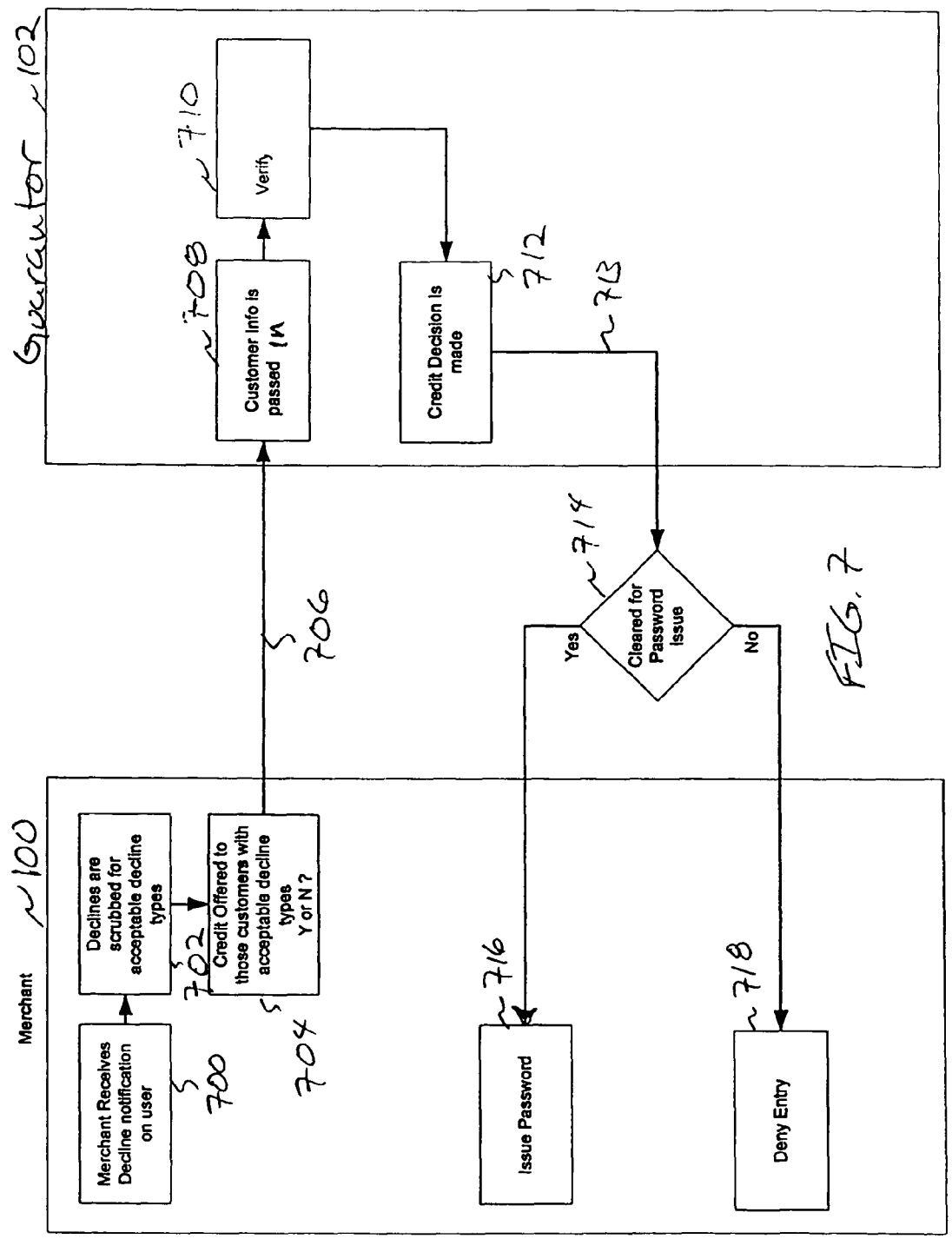
FIG. 7 is a process flow diagram of a credit offering transaction wherein a customer's information is verified and a decline type is determined in accordance with an exemplary embodiment of the present invention.

FIG. 7 is a process flow diagram of a credit offering transaction wherein a customer's information is verified and a decline type is determined in accordance with an exemplary embodiment of the present invention. The merchant 100 receives (700) a credit or payment decline for a customer. In contrast to the exemplary transaction of FIG. 5 and FIG. 6, the merchant filters (702) the decline in order to determine why the customer's tender of payment was declined. If the type of decline indicates that the guarantor is willing to offer credit to this kind of customer, the customer is immediately offered credit (704) by the merchant. If the customer accepts the offered credit, the merchant transmits customer information 706 to the guarantor. The guarantor receives (708) the customer information and then verifies (710) the customer information. If the guarantor verifies or validates the customer information, the guarantor determines (712) if the guarantor wants to offer credit to the customer based on the validated customer information. The credit decision 713 is transmitted to the merchant. Based on the guarantor's credit decision, the merchant determines (714) whether the merchant will issue a password or grant access 716 to the customer or deny entry 718 to the customer.

In contrast to the exemplary transactions of FIG. 3 and FIG. 4, the customer is granted access to the merchant's site after the guarantor has verified the customer's information and made a credit decision about whether or not to offer credit to the customer. In this exemplary transaction, the customer's information is verified by the guarantor and only customer's with specified decline types are offered credit, thus lowering the risk that the guarantor will not be paid by the customer. As such, the guarantor may pay merchant at a higher rate than the rate for a verified customer with an undetermined decline type.

Figure 8:
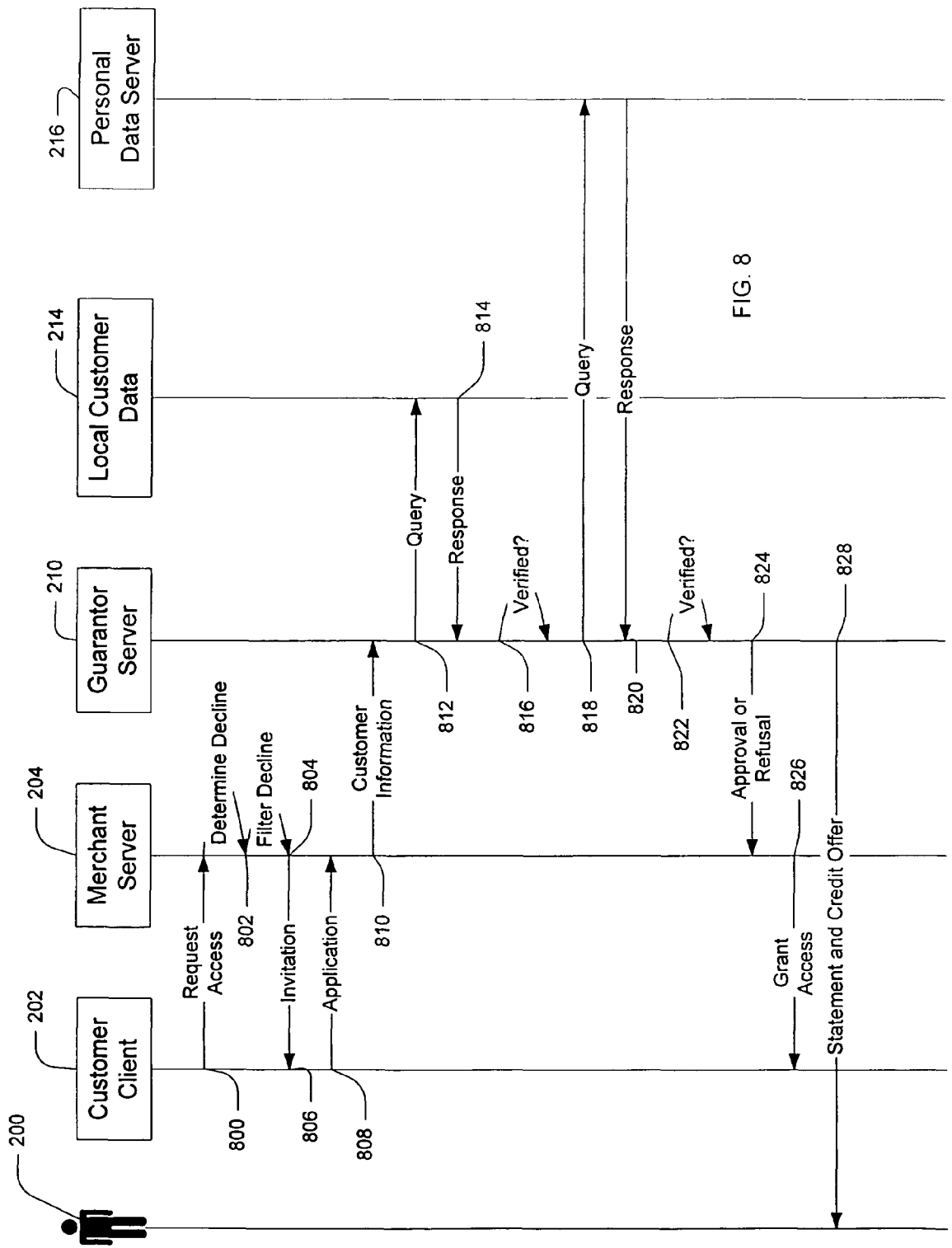
FIG. 8 is a sequence diagram of a credit offering transaction wherein a customer's information is verified and a decline type is determined in accordance with an exemplary embodiment of the present invention.

FIG. 8 is a sequence diagram of a credit offering transaction wherein a customer's information is verified and a decline type is determined in accordance with an exemplary embodiment of the present invention. In slightly more detail than in FIG. 7, the customer 200 uses the customer client 202 to transmit a request 800 for access to the merchant server 204. The request for access includes an identifier of a credit account that the customer wants the merchant to request payment from and customer information such as the customer's name, date of birth, address, and other identifying information that a guarantor may use to verify the customer's identity and credit worthiness. If the merchant server determines (802) that the request for payment is declined, the merchant server determines (804) the type of decline. If the type of decline corresponds to a type of decline that has been specified as acceptable to the guarantor, the merchant server transmits an invitation 806 for a credit application to the customer via the customer client. If the customer wants to open a credit account, the customer uses the customer client to transmit an application 808 for credit to the merchant server.

If the customer submits an application for credit, the merchant server transmits the customer information 802 to the guarantor server. The guarantor server uses the customer information to generate a query 812 for the customer database 214 maintained by the guarantor. If the query fails, meaning the guarantor cannot verify 816 the customer by a corroborating response 814 from the customer database, the guarantor server transmits a query 818 to a personal data server 216 for corroborating information. If the guarantor server receives a corroborating response 820 from the personal data server, the guarantor server verifies 822 or validates the customer. Depending on the results of the verification processes, the guarantor server transmits either an approval or a refusal 824 to the merchant server. The merchant server then transmits a grant of access 826 to the customer via the customer client if the customer was approved.

The guarantor server generates an account statement and request for payment 828 which is sent to the customer. Included with the account statement and request for payment is an offer of a credit account. In a manner similar to the payment process of FIG. 4, the customer may either pay the payment amount as requested or may accept the offer of the credit account in which case the requested payment amount is added to the balance of the offered credit account.

Figure 9:
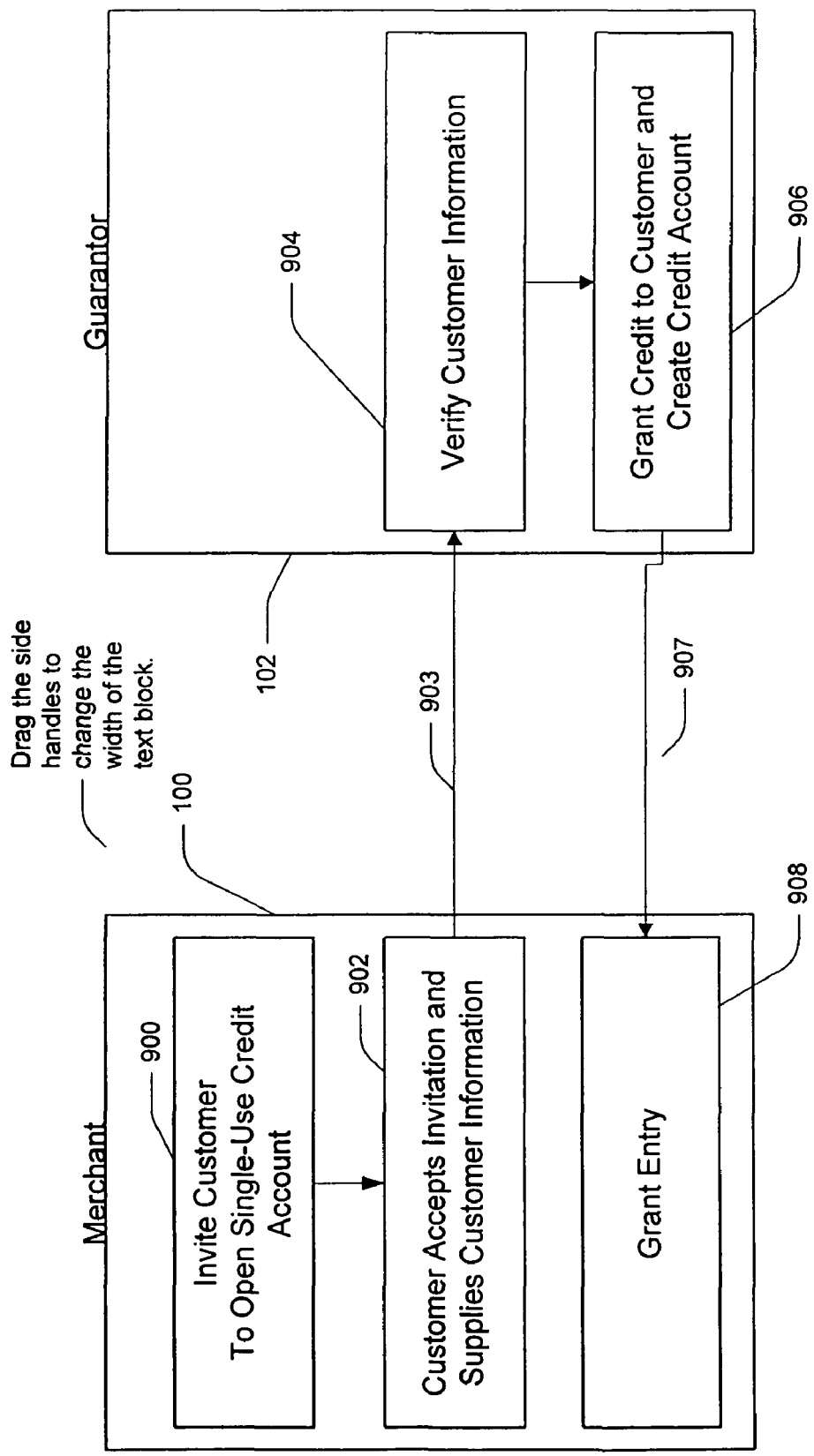
FIG. 9 is a process flow diagram of a credit offering transaction wherein a customer's information is verified and a credit account is opened for a single transaction in accordance with an exemplary embodiment of the present invention.

FIG. 9 is a process flow diagram of a credit offering transaction wherein a customer's information is verified and a credit account is opened for a single transaction in accordance with an exemplary embodiment of the present invention. Upon accessing a merchant's site, the customer is invited (900) to open a credit account in exchange for accessing the site. If the customer accepts the invitation, the customer supplies (902) identifying customer information 903 to the merchant 100 that the merchant can use to verify the customer. The merchant transmits the customer information to the guarantor 102 who attempts to verify (904) the customer information. The guarantor verifies the customer information querying databases for publicly available information about the customer and comparing the publicly available customer information to the customer supplied identifying customer information. If the publicly available information matches at least partially the customer supplied information, the guarantor may be able to verify the customer's identity. If the guarantor can verify the customer information, the guarantor grants (904) credit to the customer in the form of a credit account. If the customer is verified, the guarantor transmits a message 907 to the merchant that the customer has been granted credit. In response to the guarantor's message, the merchant grants (908) the customer entry to the merchant's site.

Figure 10:
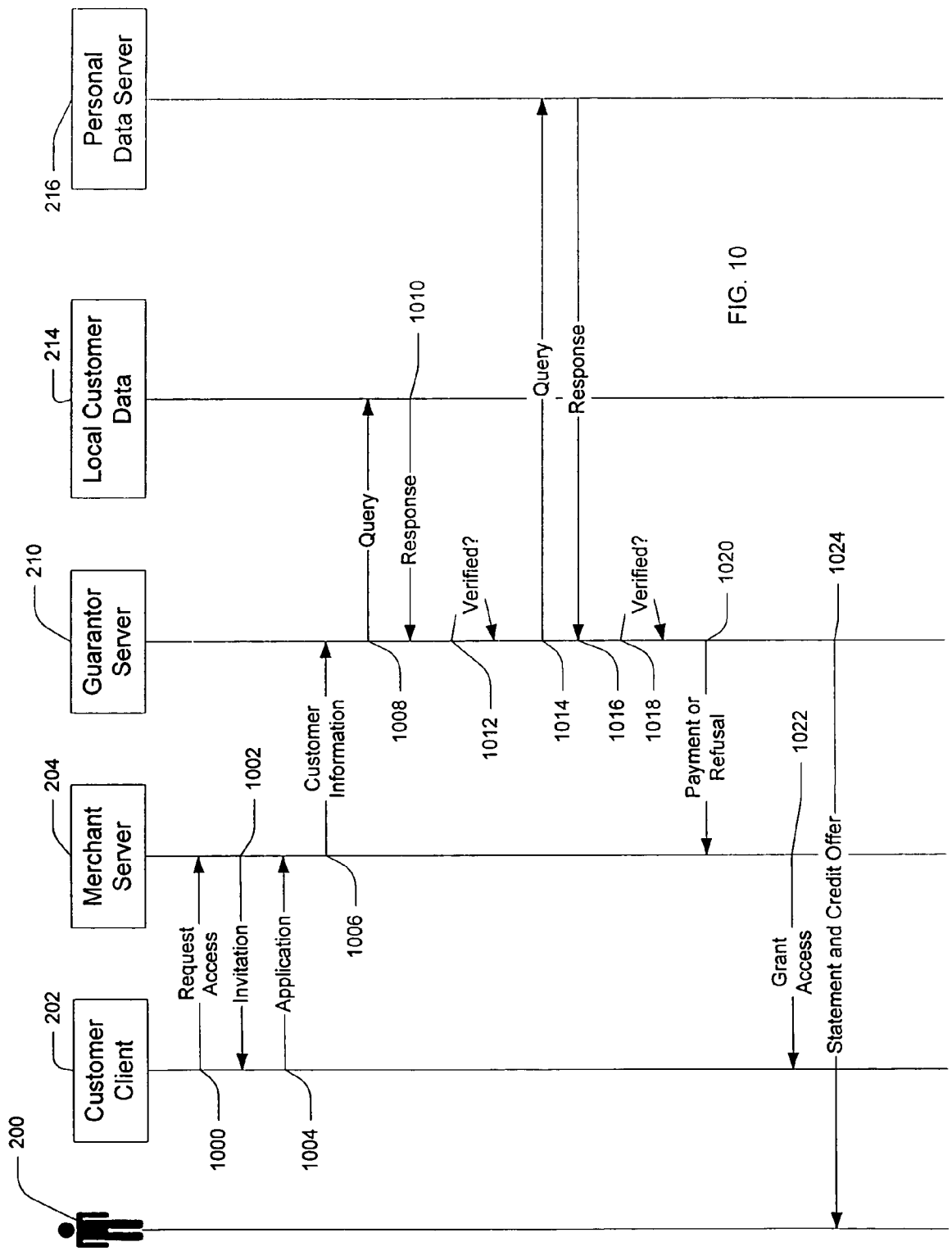
FIG. 10 is a sequence diagram of a credit offering transaction wherein a customer's information is verified and a credit account is opened for a single transaction in accordance with an exemplary embodiment of the present invention.

FIG. 10 is a sequence diagram of a credit offering transaction wherein a customer's information is verified and a credit account is opened for a single transaction in accordance with an exemplary embodiment of the present invention. In slightly more detail than in FIG. 9, the customer 200 uses a customer client 202 to transmit a request 1000 for access to the merchant server 204. In response, the merchant server transmits an invitation 1002 to the customer to open a single-use credit account in exchange for accessing the merchant server. If the customer accepts the invitation, the customer transmits an application 1004 having identifying customer information to the merchant server that the merchant can use to verify the customer. The customer information may include the customer's name, date of birth, address, or other identifying information that the merchant or a guarantor may use to verify the customer's identity and credit worthiness. The merchant server transmits the customer information 1006 to the guarantor server 210. The guarantor server uses the customer information to generate a query 1008 for the local customer database 214 maintained by the guarantor. If the query fails, meaning the guarantor cannot verify 1012 the customer by a corroborating response 1010 from the customer database, the guarantor server transmits a query 1014 to a personal data server 216 for corroborating information. If the guarantor server receives a corroborating response 1016 from the personal data server, the guarantor server verifies 1018 or validates the customer. Depending on the results of the verification processes, the guarantor server transmits either an approval or a refusal 1020 to the merchant server. The merchant server then transmits a grant of access 1022 to the customer via the customer client if the customer was approved.

The guarantor server generates an account statement and request for payment 1024 which is sent to the customer. Included with the account statement and request for payment is an offer of a credit account. In a manner similar to the payment process of FIG. 4, the customer may either pay the payment amount as requested or may accept the offer of the credit account in which case the requested payment amount is added to the balance of the offered credit account. In this case, if the customer pays the account off, the single-use credit account is closed.

Figure 11:
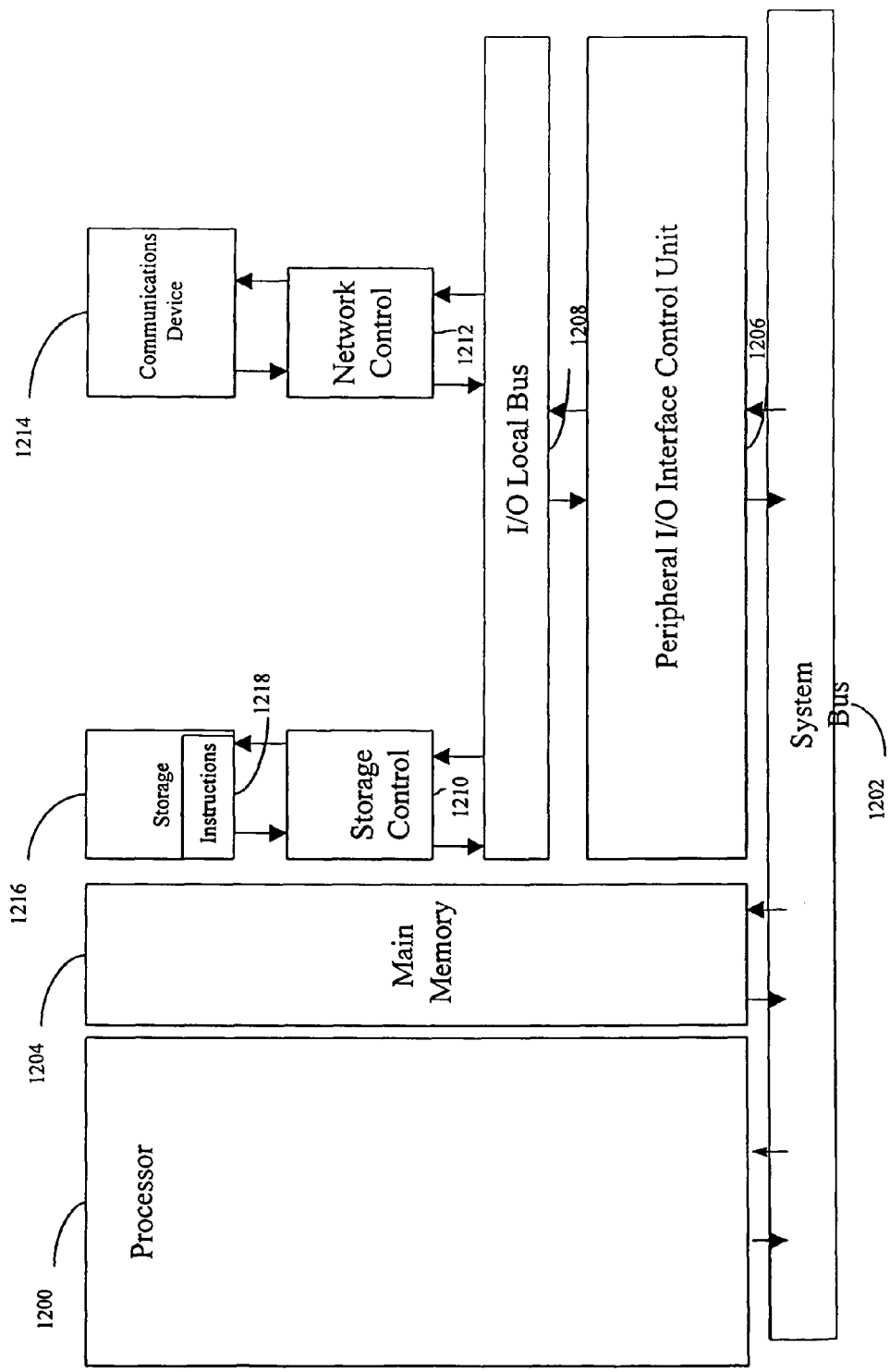
FIG. 11 is a block diagram of a data processing system suitable for use as a guarantor host in accordance with an exemplary embodiment of the present invention.

FIG. 11 is a block diagram of a data processing system suitable for use as a guarantor host in accordance with an exemplary embodiment of the present invention. A data processing system includes a processor 1200 operatively coupled via a system bus 1202 to a main memory 1204 and an I/O interface control unit 1206. The I/O interface control unit is operatively coupled via an I/O local bus 1208 to a storage controller 1210, and a network communications controller 1212. A communications device 1214 is operatively coupled to the network communications controller and is adapted to allow software objects hosted by the data processing system to communicate via a network with other software objects.

The storage controller is operatively coupled to a storage device 1216. Computer program instructions 1218 implementing a guarantor server are stored on the disk storage device until the processor retrieves the computer program instructions and stores them in the main memory. The processor then executes the computer program instructions stored in the main memory to implement the guarantor server.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supported by this application and the claims' equivalents rather than the foregoing description.

What is claimed is:

1. A method of providing credit to a customer by a merchant through a guarantor, the method comprising:
   receiving a first request from the customer by the merchant, the first request including customer information corresponding to the customer attempting to complete a transaction with the merchant;
   determining a customer credit responsive to the customer information;
   denying said first request responsive to said customer credit, by the merchant;
   transmitting the customer information by the merchant to the guarantor, responsive to the denying said first credit;
     receiving said customer information by the guarantor from the merchant;
     generating a single-use credit account for the customer by the guarantor, the single-use credit account debited for the amount of the transaction;
     transmitting a payment for the transaction by the guarantor to the merchant; and
     transmitting a request for full payment of the debited amount in the account by the guarantor to the customer.

2. The method of claim 1, further comprising:
   including an offer to convert the single-use credit account into a credit account with the request for payment by the guarantor; and
   converting the single-use credit account into a credit account by the guarantor in response to an acceptance of the offer by the customer.

3. The method of claim 1, wherein the payment for the transaction is discounted by the guarantor by a discount rate.

4. The method of claim 3, further comprising:
   verifying the customer's identity by the guarantor using the customer information; and
   adjusting the discount rate by the guarantor when the customer's identity is verified.

5. The method of claim 4, further comprising verifying the customer's identity by comparing the customer information to information in a local customer database.

6. The method of claim 4, further comprising verifying the customer's identity by comparing the customer information to information in a personal data server.

7. The method of claim 1, wherein the request includes a tender of payment, the method further comprising receiving a decline by the merchant corresponding to the tender of payment.

8. The method of claim 7, further comprising:
   receiving a decline type by the guarantor indicating why the customer's tender of payment was declined; and
   creating the account for the customer when the decline type is of a specified decline type.

9. The method of claim 1, wherein the transaction is a request for access to a merchant server.

10. The method of claim 1, wherein the transaction is a purchase of goods from a merchant server.

11. A method of providing credit to a customer by a merchant server through a guarantor server using a communications network, the method comprising:
    receiving a request for a transaction by the merchant server from a customer client used by the customer and customer information via the communications network;
    transmitting a denial of said request to the customer client via the communications network, by the merchant server;
    transmitting an offer of credit by the merchant server to the customer client via the communications network in response to the denying said request, wherein the offered credit to be used as payment for the transaction;
    receiving an acceptance of the offer of credit by the merchant server from the customer client on behalf of the customer via the communications network;
    transmitting the customer information and a transaction amount by the merchant server to the guarantor server via the communications network in response to the denying said request;
    generating by the guarantor server a single-use credit account for the customer, the single-use credit account debited for the amount of the transaction;
    transmitting a payment for the transaction by the guarantor server to the merchant server via the communications network; and
    transmitting a request for full payment of the debited amount in the single-use credit account by the guarantor server to the customer.

12. The method of claim 11, further comprising:
    including an offer to convert the account into a credit account with the request for payment by the guarantor server; and
    converting the account into a credit account by the guarantor server in response to an acceptance of the offer by the customer.

13. The method of claim 11, wherein the payment for the transaction is discounted by the guarantor server by a discount rate.

14. The method of claim 13, further comprising:
    verifying the customer's identity using the customer information by the guarantor server; and
    adjusting the discount rate when the customer is verified by the guarantor server.

15. The method of claim 14, further comprising verifying the customer's identity by comparing the customer information to information in a local customer database.

16. The method of claim 14, further comprising verifying the customer's identity by comparing the customer information to information in a personal data server.

17. The method of claim 11, wherein the request includes a tender of payment, the method further comprising receiving a decline by the merchant server corresponding to the tender of payment.

18. The method of claim 17, further comprising:
receiving a decline type by the guarantor server from the merchant server via the communications network, the decline type indicating why the tender of payment was declined; and
creating the account for the customer by the guarantor when the decline type is of a specified decline type.

19. The method of claim 11, wherein the transaction is a request for access to content on the merchant server.

20. The method of claim 11, wherein the transaction is a purchase of goods from the merchant server.

21. A data processing apparatus for providing credit to a customer by a merchant through a guarantor, comprising:
a merchant processor;
a merchant memory coupled to the merchant processor, the merchant memory having merchant program instructions executable by the merchant processor stored therein, the program instructions when executed by the merchant processor performing the following steps:
receiving a first request from the customer, the first request including customer information corresponding to the customer attempting to complete a transaction with the merchant,
determining a customer credit responsive to the customer information,
denying said first request responsive to said customer credit, and
transmitting the customer information to the guarantor, responsive to the denying said first credit;
a computer network;
a guarantor processor coupled to the merchant processor via said computer network; and
a guarantor memory coupled to the guarantor processor, the guarantor memory having guarantor program instructions executable by the guarantor processor stored therein, the program instructions when executed by the guarantor processor performing the following steps:
receiving said customer information from the merchant processor via said computer network,
generating an account for the customer, the account debited for the amount of the transaction,
transmitting a payment for the transaction to the merchant, and
transmitting a request for full payment of the debited amount in the account to the customer whereby a single-use credit account is created for the customer for completing the transaction.

22. The data processing apparatus of claim 21, the guarantor program instructions further including instructions for performing:
including an offer to convert the account into a credit account with the request for payment by the guarantor; and
converting the account into a credit account in response to an acceptance of the offer by the customer.

23. The data processing apparatus of claim 21, the guarantor programming instructions further including instructions for performing discounting the payment for the transaction by a discount rate.

24. The data processing apparatus of claim 23, the guarantor program instructions further including instructions for performing:
verifying the customer's identity using the customer information; and
adjusting the discount rate when the customer is verified.

25. The data processing apparatus of claim 24, the guarantor program instructions further including instructions for performing verifying the customer's identity by comparing the customer information to information in a local customer database.

26. The data processing apparatus of claim 24, the guarantor program instructions further including instructions for performing verifying the customer's identity by comparing the customer information to information in a personal data server.

27. The data processing apparatus of claim 21, wherein the request includes a tender of payment that was declined, the guarantor program instructions further including instructions for performing:
receiving a decline type from the merchant processor, the decline type indicating why the customer's tender of payment was declined; and
creating the account for the customer when the decline type is of a specified decline type.

28. The data processing apparatus of claim 21, wherein the transaction is a request for access to a merchant server.

29. The data processing apparatus of claim 21, wherein the transaction is a purchase of goods from a merchant server.

* * * * *